(12) United States Patent
Kageyama et al.

(10) Patent No.: US 6,217,202 B1
(45) Date of Patent: Apr. 17, 2001

(54) VEHICULAR LIGHTING FIXTURE

(75) Inventors: Hiroyuki Kageyama; Shigeyuki Soga; Fujihiko Sugiyama, all of Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 09/113,555

(22) Filed: Jul. 10, 1998

(30) Foreign Application Priority Data

Jul. 10, 1997 (JP) .................................................. 9-184859

(51) Int. Cl.⁷ ...................................................... F21V 19/00
(52) U.S. Cl. ........................... 362/516; 362/267; 362/310
(58) Field of Search .................................... 362/516, 546, 362/267, 310; 427/282

(56) References Cited

U.S. PATENT DOCUMENTS

| | | | |
|---|---|---|---|
| 5,501,780 | * 3/1996 | Iida et al. | 204/192.15 |
| 5,582,481 | * 12/1996 | Natsume | 362/336 |
| 6,017,141 | * 1/2000 | Sugiyams et al. | 362/520 |

* cited by examiner

Primary Examiner—Darren Schuberg
Assistant Examiner—Fayez Assaf
(74) Attorney, Agent, or Firm—Sughrue, Mion, Zinn, Macpeak & Seas, PLLC

(57) ABSTRACT

A vehicular lighting fixture having an improved appearance, wherein a lamp body and a lens are welded to each other and the inner face of the lamp body is subjected to a surface treatment. The vehicular lighting fixture (1) includes a lamp body (2) having a recess (3) with a front opening, a lens (8) attached to the lamp body (2) in such a manner as to cover the front opening, and a bulb (12) disposed in a lighting fixture space (10) defined by the lamp body (2) and the lens (8). The inner face (13) of the lamp body (2) is subjected to a surface treatment and the lamp body (2) and the lens (8) are connected with each other through their respective welding legs (6 and 9). A groove (7) is formed as a stepped portion inwardly of the welding leg (6) formed on the lamp body (2) to position a masking jig which masks the welding leg of the lamp body from the surface treatment. Also, the width of the legs (6 and 9) are different from each other.

26 Claims, 3 Drawing Sheets

VEHICULAR LIGHTING FIXTURE

FIELD OF THE INVENTION

The present invention relates to a novel vehicular lighting fixture and, more specifically, to a vehicular lighting fixture that is equipped with a lamp body, the inner surface of which is subjected to a surface treatment, which is designed to prevent a decrease in bonding strength between the lamp body and a lens which is welded to the lamp body.

BACKGROUND OF THE INVENTION

A conventional vehicular lighting fixture includes a lamp body having an inner surface which is subjected to a surface treatment (e.g. a reflective coating) and a lens which is welded to the lamp body. FIG. 5 shows one such vehicular lighting fixture identified by reference letter a.

Referring to FIG. 5, the lamp body b is made of a thermoplastic resin, and a welding leg c protruding in the forward direction is formed on a peripheral portion of an opening defined by the lamp body b. The lens d is also made of a thermoplastic resin, and likewise has a welding leg e formed on a peripheral portion of the lens which protrudes in the rearward direction. The welding leg e has the same width as the welding leg c formed on the lamp body b.

During assembly, the welding leg c formed on the lamp body b and the welding leg e formed on the lens d are welded to each other. However, prior to this assembly, the inner face of the lamp body b is subjected to a surface treatment to apply a coating, plating or the like, as identified by reference letter f.

The aforementioned vehicular lighting fixture a is disadvantageous in that a welding face of the welding leg c formed on the lamp body b is also subjected to the surface treatment f. The presence of the surface treatment on the welding face leads to a decrease in bonding strength between the welding leg c formed on the lamp body b and the welding leg e formed on the lens d.

Furthermore, when the welding faces of the welding legs c and e formed on the lamp body b and the lens d, respectively, are brought into contact with each other, they may be offset from each other in the lateral direction. In such a case, the welding area is reduced, which results in a further decrease in bonding strength between the welding legs c and e.

It is thus an object of the present invention to prevent a decrease in bonding strength between a lamp body and a lens of a vehicular lighting fixture, where the lamp body and the lens are welded to each other and the inner face of the lamp body is subjected to a surface treatment.

SUMMARY OF THE INVENTION

To achieve the aforementioned object, the vehicular lighting fixture of the present invention provides a structure wherein the lamp body and the lens are welded to each other through their respective welding legs but where the welding leg of the lamp body has not been subjected to a surface treatment. Thus, the surface treatment associated with coating the inside surface of the lamp body does not interfere with the bonding of the lens to the lamp body. To that end, a stepped portion is formed inwardly of the welding leg formed on the lamp body for retaining a masking jig, as discussed below.

In other words, according to the present invention, the surface treatment is carried out in a state where the masking jig is positioned by the stepped portion to insure that the welding leg formed on the lamp body is not subjected to the surface treatment. It is thus possible to prevent a decrease in bonding strength between the lamp body and the lens when welded to each other.

Another vehicular lighting fixture of the present invention provides a structure wherein the welding leg formed on the lamp body is different in width from the welding leg formed on the lens. Accordingly, even if the lamp body and the lens are welded to each other with a slight offset therebetween, the welding area is not reduced. It is thus possible to prevent a decrease in bonding strength between the lamp body and the lens.

DESCRIPTION OF THE PREFERRED EMBODIMENTS

Figure 1:
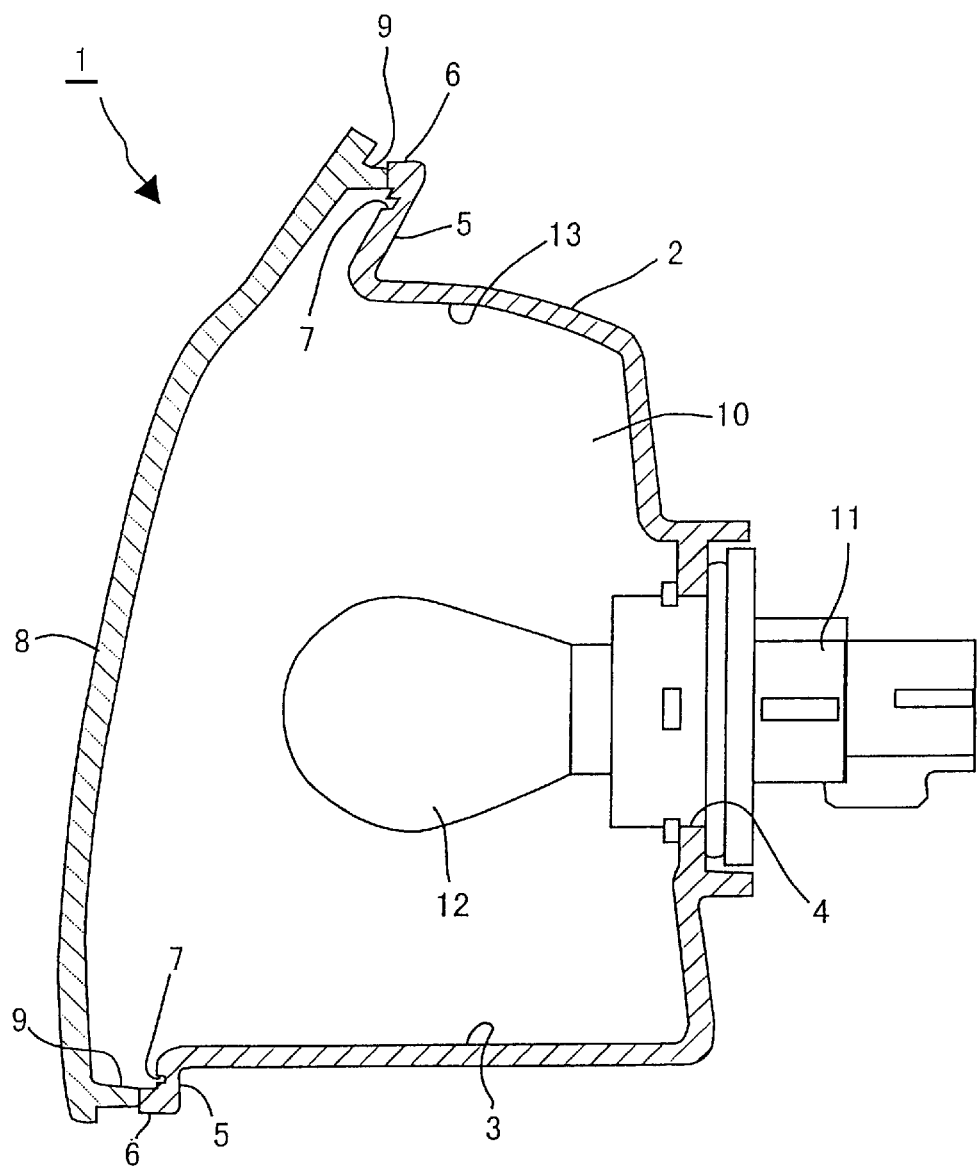
FIG. 1 is a longitudinal sectional view of a vehicular lighting fixture according to an embodiment of the present invention.

A vehicular lighting fixture according to an embodiment of the present invention will hereinafter be described with reference to the accompanying drawings. In the embodiment shown in the drawings, the present invention is applied to a vehicular marker lamp.

A vehicular marker lamp 1 is provided with a lamp body 2 defining a recess 3, a lens 8 covering a front opening of the lamp body, and a light source 12 disposed in a lighting fixture space defined by the lamp body and the lens.

The lamp body 2 is made of a thermoplastic. A bulb attachment hole 4 is formed in the rear center portion of the lamp body 2. The recess 3 has at an opening edge thereof an attachment edge portion 5 which protrudes outward.

A welding leg 6 is formed on an outer circumferential edge portion of the attachment edge portion 5 and protrudes in the forward direction. A continuous groove 7, which extends along the entire circumference of the lamp body, is formed as a stepped portion in the attachment edge portion 5. It is preferable that the groove be located at a location radially inward of the welding leg 6 by at least 1 mm, i.e. at a location biased toward the bulb attachment hole 4. It is to be noted herein that the groove 7 is "set back" with respect to the inner face of the recess 3.

The lens 8 is made of a transparent thermoplastic material. The lens includes a rearwardly protruding welding leg 9 formed on a peripheral edge portion of the lens 8.

Figure 2:
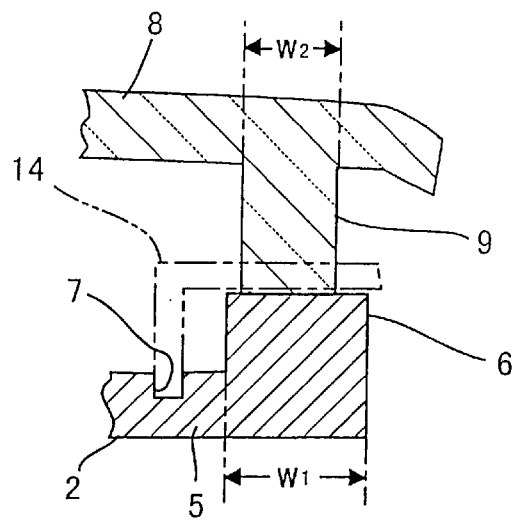
FIG. 2 is an enlarged sectional view of the bonded portion of the vehicular lighting fixture according to the embodiment of the present invention.

The welding leg 6 formed on the lamp body 2 has a width $W_1$, which is greater than a width $W_2$ of the welding leg 9 formed on the lens 8 (See FIG. 2). Comparing the invention with the conventional arrangement discussed above, the width $W_2$ of the welding leg 9 formed on the lens 8 is the same as that of the aforementioned welding leg e, and the width $W_1$ of the welding leg 6 formed on the lamp body 2 is greater than that of the aforementioned welding leg c.

Thus, when welding faces of the welding leg 9 formed on the lens 8 and the welding leg 6 formed on the lamp body 2 are brought into contact with each other, even if there is a slight offset therebetween, the welding leg 9 does not extend outside of the welding leg 6. Accordingly, when the welding legs 6 and 9 are welded to each other, the entire welding face of the welding leg 9 is welded to the welding leg 6.

In this manner, the lens 8 is welded to the lamp body 2 by means of hot plate welding, ultrasonic welding or the like. That is, both an end face of the welding leg 6 formed on the lamp body 2 and an end face of the welding leg 9 formed on the lens 8 are melted and press-fitted to each other. Then, the molten end faces solidify as they are cooled. As a result, the lens 8 is attached to the lamp body 2 to cover the front opening of the recess 3. The lamp body 2 and the lens 8 together define a lighting fixture space 10.

Thereafter, a light source is positioned in the aforementioned lighting fixture space 10. That is, a bulb 12 constituting the light source is removably fitted into a socket 11, which in turn is removably fitted into the bulb attachment hole 4 of the lamp body 2.

The inner face of the lamp body 2, i.e. surface 13 of the recess 3, is subjected to a surface treatment including, for example, the application of a reflective coating, the deposition of a reflecting layer by means of evaporation or the like. In carrying out such a surface treatment, the groove 7 serves to position a masking jig, as described below.

In more detail, as can be seen in FIG. 2, to position a masking jig 14, an edge thereof is fitted into the groove 7. In this manner, the masking jig 14 is precisely positioned and securely prevented from being displaced during the surface treatment.

The groove 7 may extend along only a portion of the circumference instead of the entire circumference. In this case, the masking jig 14 must have a protrusion which fits into the groove 7 to position the masking jig 14. However, it is preferable that the groove continuously extend along the entire circumference, as in the aforementioned embodiment, so that the coating fluid is prevented from flowing into the masked portion through a narrow gap between the edge of the masking jig 14 and the front face of the attachment edge portion 5 of the lamp body 2. As a result, a clear parting line between the surface-treated portion and the masked portion can be achieved to further improve the overall appearance.

Figure 3:
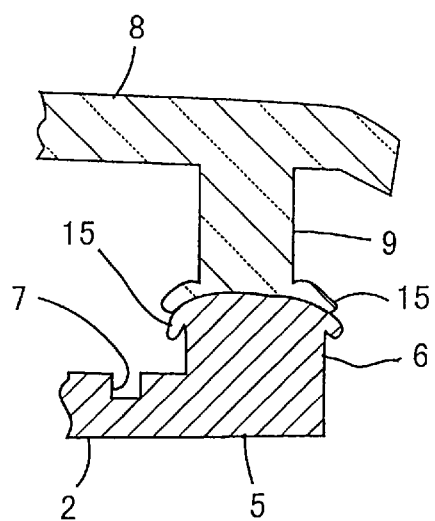
FIG. 3 is an enlarged sectional view of the bonded portion of the vehicular lighting fixture for showing an effect thereof.

As can be seen from FIG. 3, when the welding legs 6 and 9 are welded to each other a welding residue 15 bulges outwardly. However, the welding residue 15 does not enter the groove 7 or the surface-treated portion located inwardly of the groove 7, which also contributes to the improved overall appearance.

Figure 4:
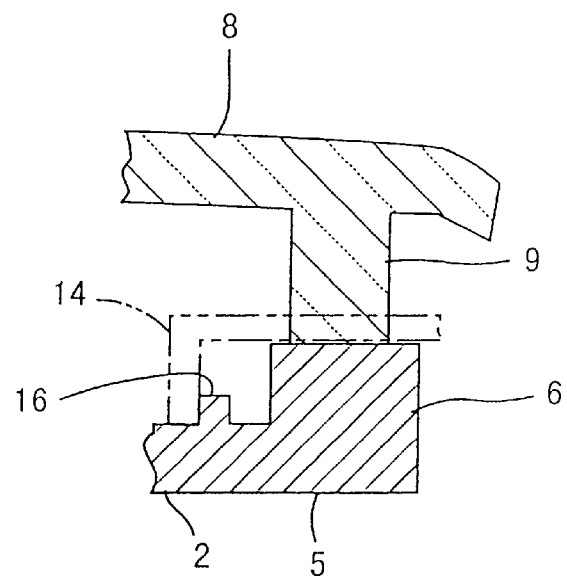
FIG. 4 is an enlarged sectional view of the bonded portion of a vehicular lighting fixture according to another embodiment of the present invention.
Figure 5:
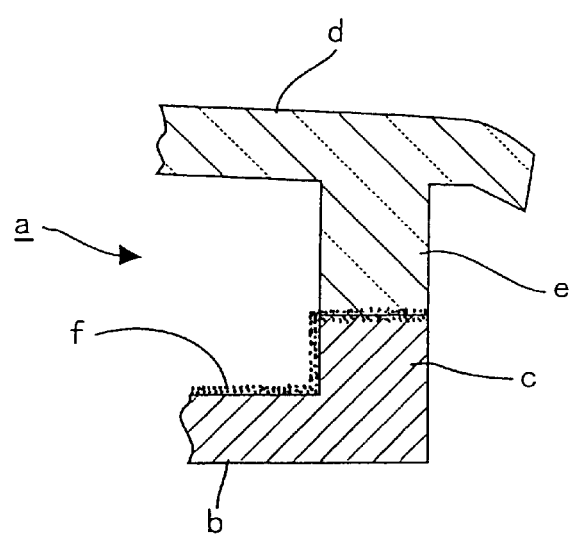
FIG. 5 is an enlarged sectional view of the bonded portion of a conventional vehicular lighting fixture.

FIG. 4 shows a vehicular lighting fixture according to another embodiment of the present invention. This embodiment is different from the aforementioned embodiment only in terms of the stepped portion. The following description will be centered on the stepped portion and the description of the other components will be omitted.

Instead of providing a groove 7 in the attachment edge portion 5 as in the previous embodiment, according to this embodiment a protrusion or projection 16 is provided. The protrusion 16 continuously extends along the entire circumference of the attachment edge portion 5 of the lamp body 2 at a location radially inward of the welding leg 6, i.e. at a location biased toward the bulb attachment hole 4. The protrusion constitutes a stepped portion. It is to be noted herein that the protrusion 16 "protrudes" from the inner face of the recess 3.

Accordingly, by bringing the edge of the masking jig 14 into contact with the protrusion 16, it is possible to precisely position the masking jig 14 and to make a clear parting line between the surface-treated portion and the masked portion. It is further possible to prevent the welding residue 15 from flowing radially inward across the protrusion 16.

Also in this embodiment, even if the protrusion 16 does not continuously extend along the entire circumference, the protrusion 16 serves to position the masking jig with a sufficient degree of precision.

As is apparent from what has been described above, the vehicular lightning fixture of the present invention includes a lamp body having a recess with a front opening, a lens attached to the lamp body in such a manner as to cover the front opening and a light source disposed in a lighting fixture space defined by the lamp body and the lens. This vehicular lighting fixture is characterized in that the inner face of the lamp body is subjected to a surface treatment, that the lamp body and the lens are connected with each other through their respective welding legs, and that a stepped portion is formed inwardly of the welding leg formed on the lamp body.

In the vehicular lighting fixture of the present invention, the inner face of the lamp body is subjected to the surface treatment in a state where a masking jig is positioned by the stepped portion, so that the welding leg formed on the lamp body is not subjected to the surface treatment. It is thus possible to prevent a decrease in bonding strength between the lamp body and the lens when welded to each other.

According to another aspect of the present invention, the stepped portion continuously extends along the entire surface. Therefore, the masking jig can be positioned with an enhanced stability. Furthermore, according to yet another aspect of the invention, the stepped portion is formed as either a groove or a protrusion. Thus, the masking jig can be stably positioned, and the groove or the protrusion prevents a so-called welding residue from bulging into the surface-treated portion.

In another vehicular lighting fixture according to the present invention, the welding leg formed on the lamp body is different in width from the welding leg formed on the lens. As a result, even if there is a slight deviation in relative location between welding faces of the lamp body and the lens, the welding area of the faces will not be reduced. Thus, the vehicular lighting fixture of the present invention is able to prevent a decrease in bonding strength between the lamp body and the lens.

It is preferable that the welding leg formed on the lamp body is greater in width than the welding leg formed on the lens, so that there is no need to increase the size of the welding leg formed on the lens in comparison with the size of the conventional welding leg. Thus, the overall appearance does not deteriorate.

It should further be apparent to those skilled in the art that various changes in form and detail of the invention as shown and described above may be made. It is intended that such changes be included within the spirit and scope of the claims appended hereto.

What is claimed is:

1. A vehicular lamp, comprising:
    a lamp body having a recess with a front opening, an inner face of said lamp body having a surface treatment, said lamp body including a first welding leg extending at least partially around the circumference thereof;
    a lens including a second welding leg, extending at least partially around the circumference thereof, which is welded to said first welding leg of said lamp body to attach said lens to said lamp body and cover said front opening, said lamp body and said lens defining a lamp chamber therein;

a light source secured to said lamp body and positioned within said lamp chamber, wherein said lamp body has a stepped portion disposed inwardly of said first welding leg; and wherein said stepped portion includes an area adapted to secure from movement a masking jig that masks said first welding leg from said surface treatment during application of said surface treatment.

2. The vehicular lamp of claim 1, wherein said stepped portion extends continuously around the entire circumference of said lamp body.

3. The vehicular lamp of claim 1, wherein said area is a groove formed in said lamp body.

4. The vehicular lamp of claim 1, wherein said area is a projection.

5. The vehicular lamp of claim 2, wherein said area is a groove formed in said lamp body.

6. The vehicular lamp of claim 2, wherein said area is a projection.

7. The vehicular lamp of claim 1, wherein a width of said first welding leg is different from a width of said second welding leg.

8. The vehicular lamp of claim 7, wherein the width of said first welding leg is greater than the width of said second welding leg.

9. The vehicular lamp of claim 1, wherein said surface treatment is a reflective coating.

10. The vehicular lamp of claim 9, wherein said reflective coating is applied in liquid form.

11. The vehicular lamp of claim 1, wherein said stepped portion is for positioning a masking jig which covers said first welding leg during application of said surface treatment.

12. The vehicular lamp of claim 1, wherein said surface treatment on the inner face of said lamp body terminates in a clear parting line on said lamp body inwardly of said first welding leg.

13. A vehicular lamp, comprising:

a lamp body having a recess with a front opening, an inner face of said lamp body having a surface treatment, said lamp body including a first welding leg extending at least partially around the circumference thereof;

a lens including a second welding leg, extending at least partially around the circumference thereof, which is welded to said first welding leg of said lamp body to attach said lens to said lamp body and cover said front opening, said lamp body and said lens defining a lamp chamber therein;

a light source secured to said lamp body and positioned within said lamp chamber, wherein a width of said first welding leg is different from a width of said second welding leg; and wherein said lamp body has an area adapted to secure from movement a masking jig during application of said surface treatment.

14. The vehicular lamp of claim 13, wherein the width of said first welding leg is greater than the width of said second welding leg.

15. The vehicular lamp of claim 13, wherein said lamp body has a stepped portion disposed inwardly of said first welding leg for positioning a masking jig which covers said first welding leg during application of said surface treatment, and wherein said stepped portion includes said area.

16. The vehicular lamp of claim 15, wherein said stepped portion extends continuously around the entire circumference of said lamp body.

17. The vehicular lamp of claim 15, wherein said area is a groove formed in said lamp body.

18. The vehicular lamp of claim 15, wherein said area is a projection.

19. The vehicular lamp of claim 16, wherein said area is a groove formed in said lamp body.

20. The vehicular lamp of claim 16, wherein said area is a projection.

21. The vehicular lamp of claim 13, wherein said surface treatment is a reflective coating.

22. The vehicular lamp of claim 21, wherein said reflective coating is applied in liquid form.

23. The vehicular lamp of claim 1, wherein said second welding leg is welded to said first welding leg by heating and pressing fitting at least one of said first and second welding legs to the other of said first and second welding legs.

24. The vehicular lamp of claim 13, wherein said second welding leg is welded to said first welding leg by heating and pressing fitting at least one of said first and second welding legs to the other of said first and second welding legs.

25. The vehicular lamp of claim 13, wherein said surface treatment on the inner face of said lamp body terminates in a clear parting line on said lamp body inwardly of said first welding leg.

26. A vehicular lamp body prepared for an application of a surface treatment, comprising:

a recess with a front opening having an inner face which receives the surface treatment coating;

a first welding leg extending at least partially around the circumference thereof;

a stepped portion disposed inwardly of said first welding leg; and a masking jig positioned on said stepped portion, said masking jig covering said first welding leg for protection during application of said surface treatment.

* * * * *